US007634490B2

(12) United States Patent
Krieg et al.

(10) Patent No.: US 7,634,490 B2
(45) Date of Patent: Dec. 15, 2009

(54) LINK GENERATION SYSTEM TO ALLOW INDEXING OF DYNAMICALLY GENERATED SERVER SITE CONTENT

(75) Inventors: Jeremy Darren Krieg, Blair Athol (AU); Jonathan James Schutz, Upper Hermitage (AU); Richard Simon Flay, Happy Valley (AU)

(73) Assignee: YourAmigo Limited, Adelaide, South Australia (AU)

( * ) Notice: Subject to any disclaimer, the term of this patent is extended or adjusted under 35 U.S.C. 154(b) by 49 days.

(21) Appl. No.: 10/520,615

(22) PCT Filed: Jul. 11, 2003

(86) PCT No.: PCT/AU03/00904

§ 371 (c)(1),
(2), (4) Date: Mar. 9, 2005

(87) PCT Pub. No.: WO2004/008340

PCT Pub. Date: Jan. 22, 2004

(65) Prior Publication Data

US 2005/0177595 A1    Aug. 11, 2005

(30) Foreign Application Priority Data

Jul. 11, 2002    (AU) .............................. 2002950134

(51) Int. Cl.
G06F 7/00    (2006.01)
(52) U.S. Cl. ..................................................... 707/102
(58) Field of Classification Search ................... 707/102
See application file for complete search history.

(56) References Cited

U.S. PATENT DOCUMENTS

| 5,963,934 | A  | * | 10/1999 | Cochrane et al. ................ 707/2 |
| 6,199,098 | B1 | * | 3/2001  | Jones et al. .................... 709/203 |
| 6,779,152 | B1 | * | 8/2004  | Conner et al. ................... 715/509 |
| 2002/0188680 | A1 | * | 12/2002 | McCormack et al. .......... 709/204 |
| 2003/0191737 | A1 | * | 10/2003 | Steele et al. ..................... 707/1 |

FOREIGN PATENT DOCUMENTS

WO    WO 01/46856 A1    6/2001

(Continued)

OTHER PUBLICATIONS

Brandman, O., et al., "Crawler-Friendly Web Servers," Performance Evaluation Review ACM USA, vol. 28, No. 2, Sep. 2000, pp. 9-14, XP002465508.

(Continued)

*Primary Examiner*—Apu M Mofiz
*Assistant Examiner*—Ajith Jacob
(74) *Attorney, Agent, or Firm*—Nixon & Vanderhye PC

(57) ABSTRACT

A link generator generates links to servable data to allow the servable content of a network server to be accessed using the links. Encoded links in a form suitable for an indexing agent are generated and used to access dynamically generated data in a database of the network server and to analyze same to determine query data for retrieving servable data from the database. A proxy server receives a request generated in response to selecting one of the encoded links, translates the request, and forwards it to the network server to access corresponding dynamically generated data.

35 Claims, 10 Drawing Sheets

FOREIGN PATENT DOCUMENTS

| WO | WO 02/07013 A2 | 1/2002 |
| WO | WO 0225463 A1 * | 3/2002 |

OTHER PUBLICATIONS

"Apache Reference: mod rewrite, RewriteRule," Internet Citation, Sep. 10, 2000, XP002252183, retrieved from the Internet: URL:http://www.apacheref.com/ref/mod_rewrite/RewriteRule.html.

King-Ip Lin et al., "Automatic Information Discovery from the "Invisible Web"", International Conference on Information Technology; Coding and Computing, Las Vegas, Nevada, Apr. 8-10, 2002.

* cited by examiner

US 7,634,490 B2

LINK GENERATION SYSTEM TO ALLOW INDEXING OF DYNAMICALLY GENERATED SERVER SITE CONTENT

This application is the US national phase of international application PCT/AU2003/000904 filed 11 Jul. 2003 which designated the U.S. and claims benefit of AU 2002950134, dated 11 Jul. 2002, the entire content of which is hereby incorporated by reference.

FIELD OF THE INVENTION

The present invention relates to a link generation system and process for generating links for a structured data set or network site such as a web site.

BACKGROUND

The ever increasing amount of information available on the Internet can make it extremely difficult to locate information relevant to a topic of interest. In the case of information available on the world-wide web, search engines have been developed for generating lists of hypertext markup language (HTML) documents or web pages matching one or more search terms supplied by a user. These lists of pages are generated from inverted indices generated by analysing the content of individual web pages. These web pages are retrieved by software modules known as spiders or web-crawling agents that crawl the web, using the hypertext transfer protocol (HTTP) to retrieve individual web pages, analyse content of those pages, and generate indices. This may involve identifying hyperlinks to other web pages, retrieving those linked pages, and analysing their content. Spiders can be used to generate indices for the world-wide web itself, or can be restricted to one or more specified web sites.

A web site can be viewed as a directed graph or digraph, with the servable content i.e., the content that is able to be served) forming the nodes in the graph and directed links between the nodes corresponding to hypertext links within web pages of the site. A spider begins at one of the nodes in a web site, and then follows the links from that node to other nodes, and so on. The spider can perform whatever processing is desired for the nodes as it encounters them. In the case of a search engine spider, this involves indexing node content, but other spider types can be used to perform other tasks such as checking for broken hyperlinks or spell checking documents.

Unfortunately, not all web sites are completely connected—many have pages that are not directly connected to the rest of the web site through a hypertext link. In such a disconnected web site, a spider is unable to visit all of the nodes of the web site. This problem is especially pronounced in sites whose web pages include dynamic content. In the case of an indexing spider, a significant proportion of a site's content may not be accessible by a corresponding search engine. As more web sites convert their content from pre-existing, static web pages to more flexible and easier to maintain web pages including dynamically generated content, this problem will become even more significant.

Lack of full connectedness in a web site is also a potential problem for web site administrators who are trying to track their site's content. Without a completely connected graph of the site, it can be a difficult task to find all of the site content. For large sites with many content contributors, this task can become almost impossible.

Content that is not indexed by search engines has been referred to as 'the invisible web,' because it is not generally visible. It has even been suggested that the majority of information available on the web is invisible. Because invisible content is inaccessible to search engines, it decreases the visibility of web sites with invisible content, and degrades the usefulness of the web in general by making such content difficult to find.

It is desired, therefore, to provide a link generation system and process that alleviate one or more of the above difficulties, or at least to provide a useful alternative to existing link generation systems and processes.

SUMMARY OF THE INVENTION

In accordance with the present invention there is provided a link generation process executed by a computer system, including:
  processing data files of a network site to identify valid parameters for generating dynamically generated content of said network site; and generating encoded links for accessing said dynamically generated content, said encoded links including said parameters and being in a form suitable for an indexing agent to allow indexing of said dynamically generated content.

The present invention also provides a link generation process executed by a computer system, including generating at least one encoded link for retrieving dynamic content data of a hierarchical data set in response to selecting said at least one encoded link, said at least one encoded link including one or more parameters for generating said dynamic content data and being in a form suitable for an indexing agent to allow indexing of said dynamic content data.

The present invention also provides a link generation process, including:
  generating encoded links for dynamic content of a network site, each of said encoded links including one or more parameters for use in generating said dynamic content and being in a form suitable for an indexing agent to allow indexing of said dynamic content;
  receiving requests from an indexing agent for content of said site; and
  responding to said requests with said encoded links and said dynamic content corresponding thereto for indexing.

The present invention also provides a link generation system, including:
  a content discovery module for processing data files of a network site to identify servable data and parameters for generating dynamically generated content of said servable data; and
  a link generator for generating links to said servable data to allow said servable content to be accessed using said links, said links including encoded links for accessing said dynamically generated content, said encoded links including said parameters and being in a form suitable for an indexing agent to allow indexing of said dynamically generated content.

The present invention also provides a link generation system, including:
  one or more content discovery modules for processing data files of respective network servers to identify servable data and parameters for generating dynamically generated content of said servable data; and
  a link generator for generating links to said servable data to allow said servable content to be accessed using said links, said links including encoded links for accessing said dynamically generated content, said encoded links including said parameters and being in a form suitable for an indexing agent to allow indexing of said dynamically generated content.

BRIEF DESCRIPTION OF THE DRAWINGS

Preferred embodiments of the present invention are hereinafter described, by way of example only, with reference to the accompanying drawings, wherein.

DETAILED DESCRIPTION OF THE PREFERRED EMBODIMENT

Figure 1:
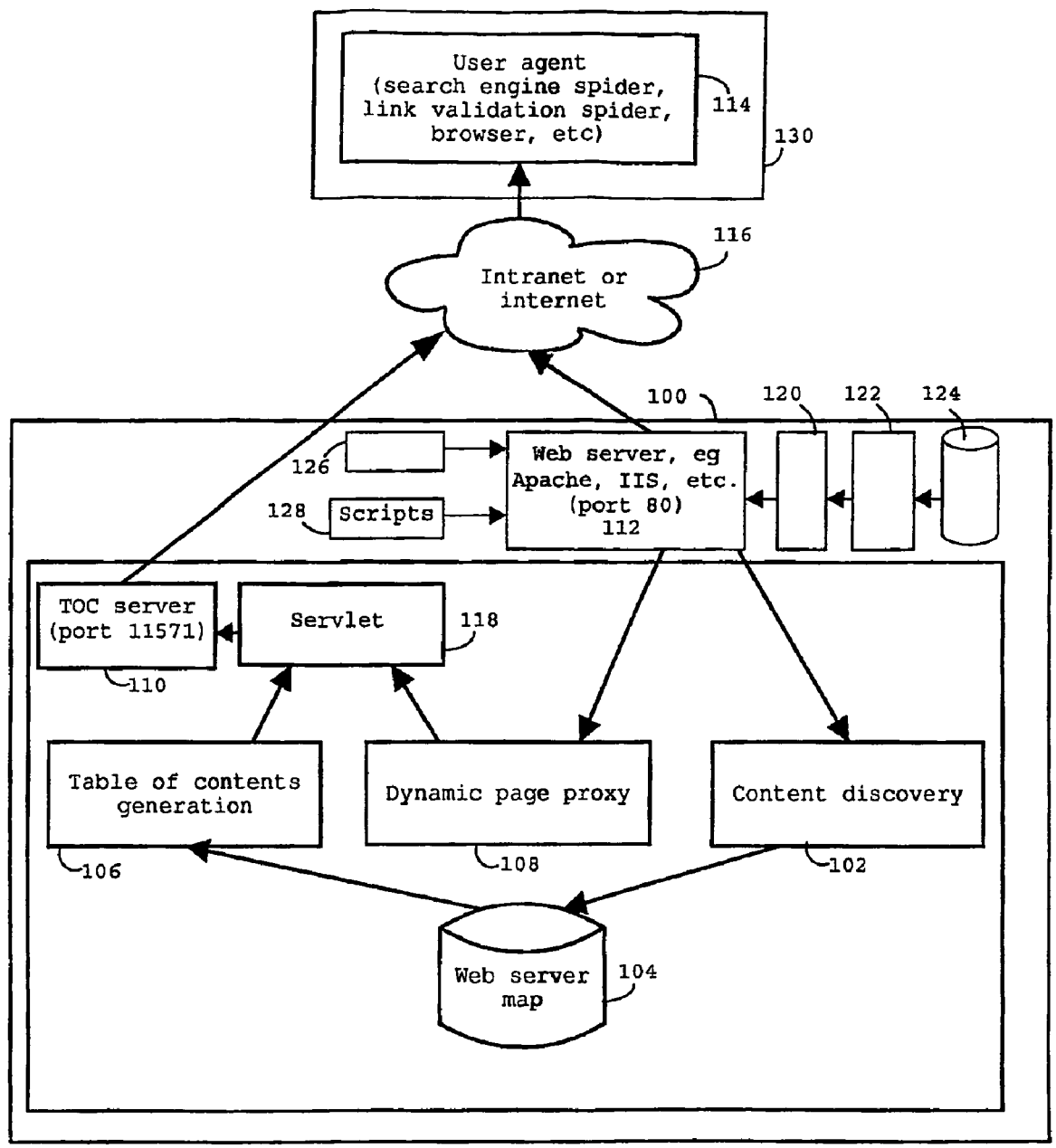
FIG. 1 is a block diagram of a preferred embodiment of a link generation system connected to a remote user agent via a communications network.
Figure 2:
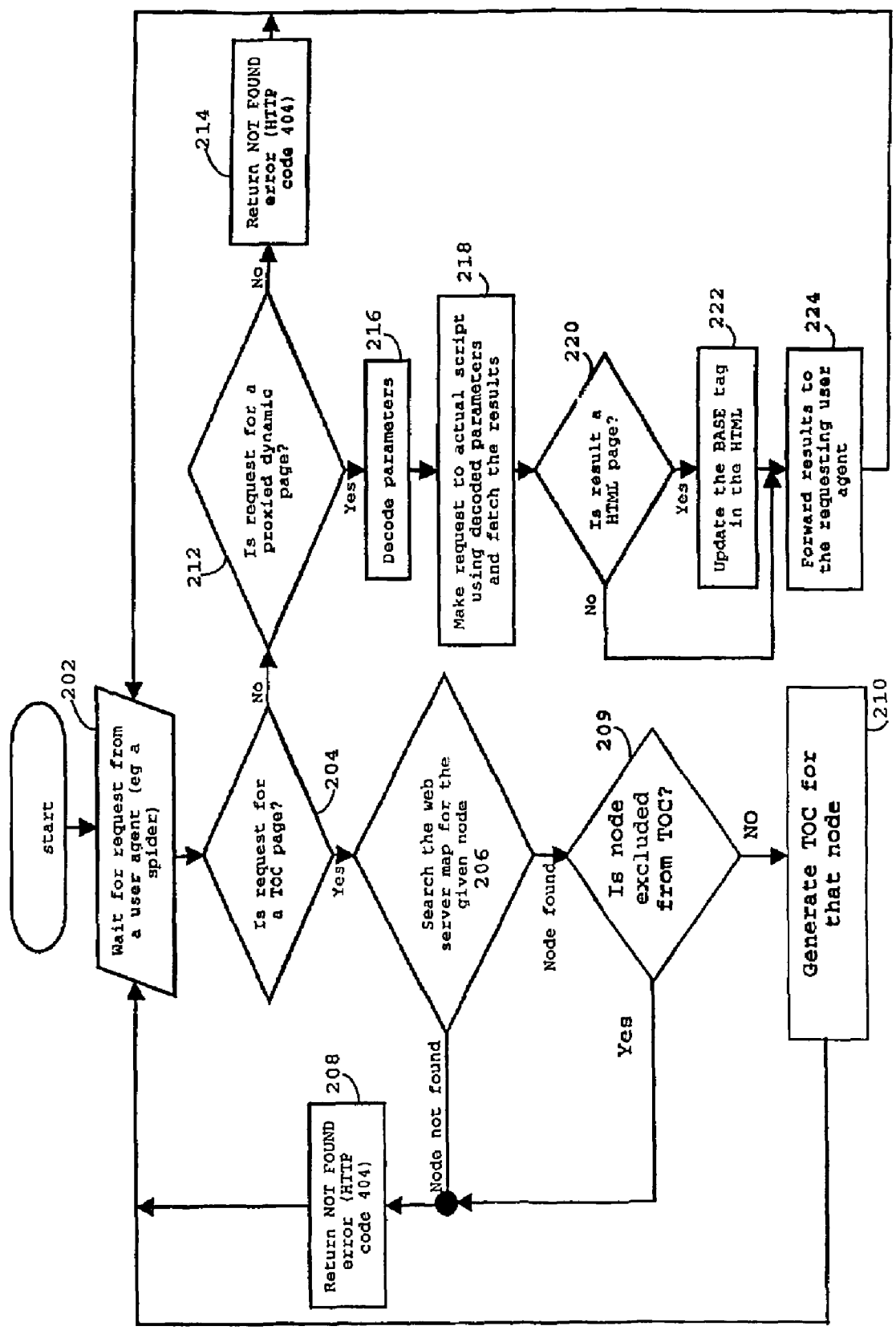
FIG. 2 is a flow diagram of a table of contents (TOC) generation process executed by the link generation system.

As shown in FIG. 1, a link generation system 100 includes a content discovery module 102, a web server map (WSM) database 104, a table of contents (TOC) generation module 106, a dynamic page proxy module 108, a TOC server 110, a servlet 118, a web server 112, a scripting language module 120, a database module 122, a content database 124, static content files 126 (e.g., hypertext markup language (HTML) and image files), and scripts 128 for generating dynamic content. The link generation system 100 can be accessed by a user agent 114 executing on a remote computer system 130 via a communications network 116, such as the Internet.

The link generation system 100 executes a table of contents generation process that generates a table of contents (TOC) for all of the servable content of each web site served by the web server 112. The servable content includes the static content files 126, the scripts 128, and the content stored in the content database 124. The TOC is effectively a fully connected graph of a complete web site, thereby making the site's entire content available to user agents. The TOC is generated in hypertext markup language (HTML), allowing the entire content of the web server 112, including dynamically generated content, to be accessed by the remote user agent 114 by following hyperlinks of each page of the TOC. The remote user agent 114 is a search engine spider, and is thus able to provide access to all servable content of the web server 112 in response to search queries provided by a user to a corresponding search engine. However, the web server 112 and link generation system 100 can also be accessed by other types of user agent, including standard web browsers and link validation spiders. The TOC thus also serves as an administration tool for administrators of the web server 112 who wish to browse through web sites served by the web server 112.

In the described embodiment, the link generation system 100 and the remote computer system 130 are standard computer systems, such as Intel™-based computer systems running a Unix™ operating system, and the table of contents generation process is implemented by the modules 102, 106 to 110, 118 of the link generation system 100 which are software modules stored on disk storage of the link generation system 100. The TOC server 110 is a lightweight HTTP server such as Jetty, available at http://www.mortbay.org/jetty/index.html, and the web server 112 is a standard HTTP server module such as Apache™, available at http://www.apache.org, or Microsoft Internet Information Server (IIS)™. The web server 112 is configured to receive requests on port 80 of the link generation system 100, the standard port number for HTTP requests, whereas the TOC server 110 listens for requests on port 11571.

The database module 122 is a standard SQL module such as MySQL, available at http://www.mysql.com, providing an SQL interface to the content database 124, which stores dynamic web site content. The scripting module 120 provides a scripting language such as PHP, available from http://www.php.net, that provides an interface between the database module 122 and the web server 112, allowing content retrieved from the content database 124 to be served as HTML by the web server 112. The scripts 128 are PHP scripts that are processed by the scripting module 120 to generate dynamic content. A PHP script can contain SQL statements that are processed by the database module 122.

It will be apparent to those skilled in the art that the modules 102 to 110, 118 of the link generation system 100 can be alternatively distributed over a number of computer systems and locations, and that at least part of the table of contents generation process can be alternatively implemented by dedicated hardware circuits such as application-specific integrated circuits (ASICs).

An administrator can configure the link generation system 100 for the web site or sites served by the web server 112 by providing a list of any virtual hosts and their aliases, and the paths to the root directories for the servable content for each virtual host. Alternatively, the administrator can select the particular web server software of the web server 112. For example, if the web server software is Apache™ or Microsoft Internet Information Services™ (IIS), the link generation system 100 can determine the content locations automatically, based on knowledge of the locations and structures of the configuration files of these servers. The administrator also configures the system by providing information on any dynamic content scripts on the web server 112 so that the link generation system 100 can generate parameter-value tuples to generate servable content, as described below. For each script that accesses the content database 124 of the web server 112, the administrator provides (i) the location of the script, (ii) the list of parameters used in any SQL SELECT statements in the script, and (iii) the database connection parameters required to access the content database 124.

The entire content servable by the web server 112, including all possible dynamic content, can be determined by the content discovery module 102. The content discovery module executes a content discovery process, as described in the specification of International Patent Application No. PCT/AU00/01554, and incorporated herein by reference. The content discovery process determines the servable content of the web server 112 by analysing every file in the server's content directory tree to determine whether it is a script, such as a PHP or ASP script, which is used to generate dynamic content For each script, all possible dynamic content is determined by determining all possible combinations of parameters and parameter values that can be provided to each script, based on analysis of the tables in the content database 124 queried by the script. Such scripts typically execute SQL queries on the content database 124 of the web server 112 to extract dynamic content such as articles or product information. By identifying the parameters in SQL SELECT statements used to query the databases, and then analysing the database tables to determine possible values for these and other parameters (some of which may not even be included in the dynamic web page files or scripts used to query the content database 124), all possible combinations of parameter-value pairs used to generate dynamic content can be stored in a node of a data structure referred to as a web server map (WSM) which is stored in the web server map database 104. The content discovery module 102 can be configured to execute the content discovery process at regular intervals or in response to content modification, thereby maintaining an up-to-date web server map for all servable content of the web server 112, ensuring that the web server map database 104 and the content are closely synchronised. Nodes of the WSM are retrieved from the database 104 by the table of contents (TOC) generation module 106, which uses them to generate a complete, hyperlinked, hierarchical table of contents for each site served by the web server 112, as described below.

The TOC comprises a hierarchical set of HTML documents or web pages corresponding to the hierarchy of nodes in the WSM database 104 which, in turn, is based on the hierarchical file structure or universal resource indicator (URI) tree of the web server's servable content. Thus a servable file of the web server's static content 126 is represented as a terminal node in the WSM database 104, whereas a directory of the web server is represented as a node with one or more child nodes or children corresponding to the files and/or directories within the directory (unless the directory is empty). Similarly, a script is represented by a node that will have its own child nodes if the script generates variable dynamic content depending upon the parameters provided to it. If a node has one or more children, its page is referred to as a "TOC page", meaning that it contains links to other nodes. Each link provides information required to access the corresponding node, and is typically, but not necessarily, a hyperlink If a node does not have any children, its page is the content of that node, i.e., the node is provided as a URI referencing the corresponding web server node's content, i.e., the web page corresponding to that node on the web server 112. Although such a page is considered to be part of the TOC, it is not referred to herein as a "TOC page" to distinguish it from TOC pages generated by the system 100. Every TOC page contains a link to the corresponding page (which may or may not be a TOC page itself) for each of the child nodes of the URI tree node that the TOC page represents. If a node has both children and content of its own, then the TOC page for that node includes a link referencing the node's own content. A link referring directly to a node is referred to as a direct link, whereas a link referring to another node via the dynamic page proxy module 108, as described below, is referred to as an indirect link. The direct and indirect links may be placed in one or more TOC pages.

The link generation system 100 can be configured to pre-generate the TOC at periodic intervals or in response to updates in the web server map database 104, but is preferably invoked to dynamically generate an individual TOC page in response to a request from a user agent such as the user agent 114 of FIG. 1, as described below. The TOC generated by the link generation system 100 is stored or referenced (as the case may be) under a user-configurable base URI such as /spiderlinker/, corresponding to a subdirectory of the TOC server's servable content root directory. This directory contains a file named "toc.html", which is the top level of the TOC hierarchy. The directory also contains two subdirectories: "/spiderlinker/toc" contains the remainder of the TOC hierarchy, and "/spiderlinker/content" represents servable content of the web server 112 generated by the dynamic page proxy module 108, as described below.

One advantage of a hierarchical TOC is that it is easier for a human user to browse the pages, thus increasing its utility as an administration tool. However, this structure introduces an unnecessary overhead for spiders that traverse the TOC pages. Alternatively, the link generation system 100 can be configured to generate the TOC as a single TOC page with links to all of the content, however such a page is typically extremely large. This may or may not adversely affect spider operation, but reduces the TOC's value as an administration tool. Alternatively, the link generation system 100 can be configured to generate the TOC as multiple TOC pages in order to maintain a reasonable page size, but as a series of daisy-chained web pages having a flat structure rather than a hierarchical structure. That is, each TOC page can include a single link to the previous page (unless the TOC page is the first TOC page), and a single link to the next page (unless the TOC page is the last TOC page). This allows the links to be sorted according to some measure, such as access frequency of each link.

A WSM node for a script is referred to as a ScriptNode. Because a TOC page is generated for a node if the node has children, TOC pages are created for nodes in the WSM that correspond to directory nodes or ScriptNodes that have children. A ScriptNode has children if the corresponding script accepts one or more parameter-value pairs to generate variable dynamic content. The link generation system 100 generates URIs for directory nodes and ScriptNodes that are based on the URI for that directory or script, with the suffix ".html" appended to it For example, the TOC page URI for a directory "/forum/images/" is "/spiderlinker/toc/forum/images.html"; similarly, the TOC page URI for a script "/forums/viewmessage.php" is "/spiderlinker/toc/forum/viewmessage.php.html", where the URI prefixes (e.g., "http://www.mysite.com") have been omitted from these URIs for brevity. Where it is not considered confusing to do so, URIs given below will also be so abbreviated.

If a script accepts parameters by the HTTP GET and/or POST methods (described further below), then a TOC page is generated for the script according to which method is supported by the script, and the corresponding node is referred to as an HTTPMethodNode. A URI for an HTTPMethodNode TOC page is constructed from the URI for the script, followed by a forward slash character "/", and then 'G.html' (for the GET method) or 'P.html' (for the POST method). For example, the TOC page URI for the GET HTTPMethodNode for a script "/forums/viewmessage.php" is "/spiderlinker/toc/forums/viewmessage.php/G.html."

A child of an HTTPMethodNode is referred to as a DynamicContentParameterNode, or DCPN. TOC URIs for these nodes are constructed from the URI for the HTTPMethodNode under which they are placed (without the trailing ".html" suffix), concatenated with the corresponding URI-encoded partial-parameter string, followed by "html". For example, consider a script named "/forums/viewmessage.php" that generates dynamic content by accepting two combinations of parameters by the POST method: "b=1&a=2&c=3" and "b=1&a=2&c=4". The web server map database 104 therefore contains a DCPN corresponding to b=1&a=2, with two children for c=3 and c=4. This demonstrates how nodes are generated for scripts that accept multiple parameters by collecting common parameter-value pairs together and generating child nodes for additional parameters. The TOC URI for this DCPN is "/spiderlinker/toc/forums/viewmessage.php/Pb=1&a=2.html", where the "b=1&a=2" portion is URI-encoded. URI-encoding replaces an illegal character such as "=" and "&" with a multi-character equivalent that is a "%" character followed by an ASCII text representation of the hexadecimal ASCII code for the character. For example, the "=" character is represented by the sting "%3D", and the "&" character is represented by "%26". Consequently, the above URI, when URI-encoded, becomes "/spiderlinker/toc/forums/viewmessage.php/Pb%3D1%26a%3D2.html". URI-encoding such a link ensures that a spider will process the link.

A TOC page typically includes a page title, a list of links to other TOC pages and content pages, and a footer. The links include, where applicable, links to the child nodes of the node corresponding to the TOC page, a link to the content of the node, and a link to the next superior TOC page in the TOC hierarchy. The footer contains a brief message indicating that the TOC page was generated by the link generation system 100, a copyright message with a link to the web site of the provider of the link generation system 100, and a timestamp providing the date and time that the TOC page was generated.

The web server 112 can be configured to direct the user agent 114 to the TOC server 110 where appropriate. This is done by executing a script on the link generation system 100 that inspects the User-Agent field of HTTP requests received on port 80 of the link generation system 100 to determine whether the particular user agent sending the request is a web browser or a spider. If the user agent is a standard web browser, then standard web content can be served directly from the web server 112. Otherwise, if the user agent is a search engine spider, then the request can be forwarded to the TOC server 110, with appropriate modifications. For example, if a URI of a web site served by the web server 112 is http://www.mysite.com, then if a request for this URI is received from a spider, the script can modify the request to refer to "/spiderlinker/toc.html", where the file "/spiderlinker/toc.html" is the root of the TOC hierarchy, as described above, and redirect the request to port 11571 of the link generation system 100, the port number for accessing the TOC server 110. Alternatively, a hyperlink pointing directly to the TOC server 110, such as http://www.mysite.com:11571/spiderlinker, can be hidden in a web page served by the web server 112. When a search engine spider scans such a page for hyperlinks, the hyperlink pointing to the TOC server 110 will be included, and thus all of the servable content of the web server 112, including dynamic content, can be indexed by the search engine spider via the TOC.

When the link generation system 100 receives an HTTP request from a user agent, such as the user agent 114, the link generation system 100 executes a table of contents (TOC) generation process, as shown in FIGS. 2 to 7. The arrows in FIGS. 2 to 7 show the flow of data, rather than the flow of requests or other control messages. The TOC generation process begins at step 202 of FIG. 2 when the request is received by the TOC server 110 and forwarded to the servlet 118. At step 204, the servlet 118 determines whether the request is for a TOC page based on the presence of the prefix string "/spiderlinker/toc" in the request. If the request is for a TOC page, corresponding to a node of the TOC hierarchy, then the request is forwarded to the TOC generation module 106. The TOC generation module 106 executes a TOC page generation process that generates a table of contents page for the node, including direct and/or indirect links to all that node's content servable by the web server 112, based on the web server map generated by the content discovery module 102 and stored in the database 104.

At step 206, the TOC module 106 searches the web server map 104 for the node corresponding to the user agent's request. If the page is not found, then the TOC generation module 106 indicates this to the servlet 118, which generates a NOT FOUND error (HTTP code 404) at step 208 and sends it to the TOC server 110 which forwards it to the user agent 114. Otherwise, if the node is found, then a check is performed at step 209 to determine whether the node is to be excluded from the TOC. This step is executed because the link generation system 100 allows an administrator to specify selected URIs to be excluded from the TOC. If the node is marked as excluded, then the NOT FOUND error (HTTP code 404) is returned. Otherwise, the table of contents page for that node is generated at step 210.

Figure 3:
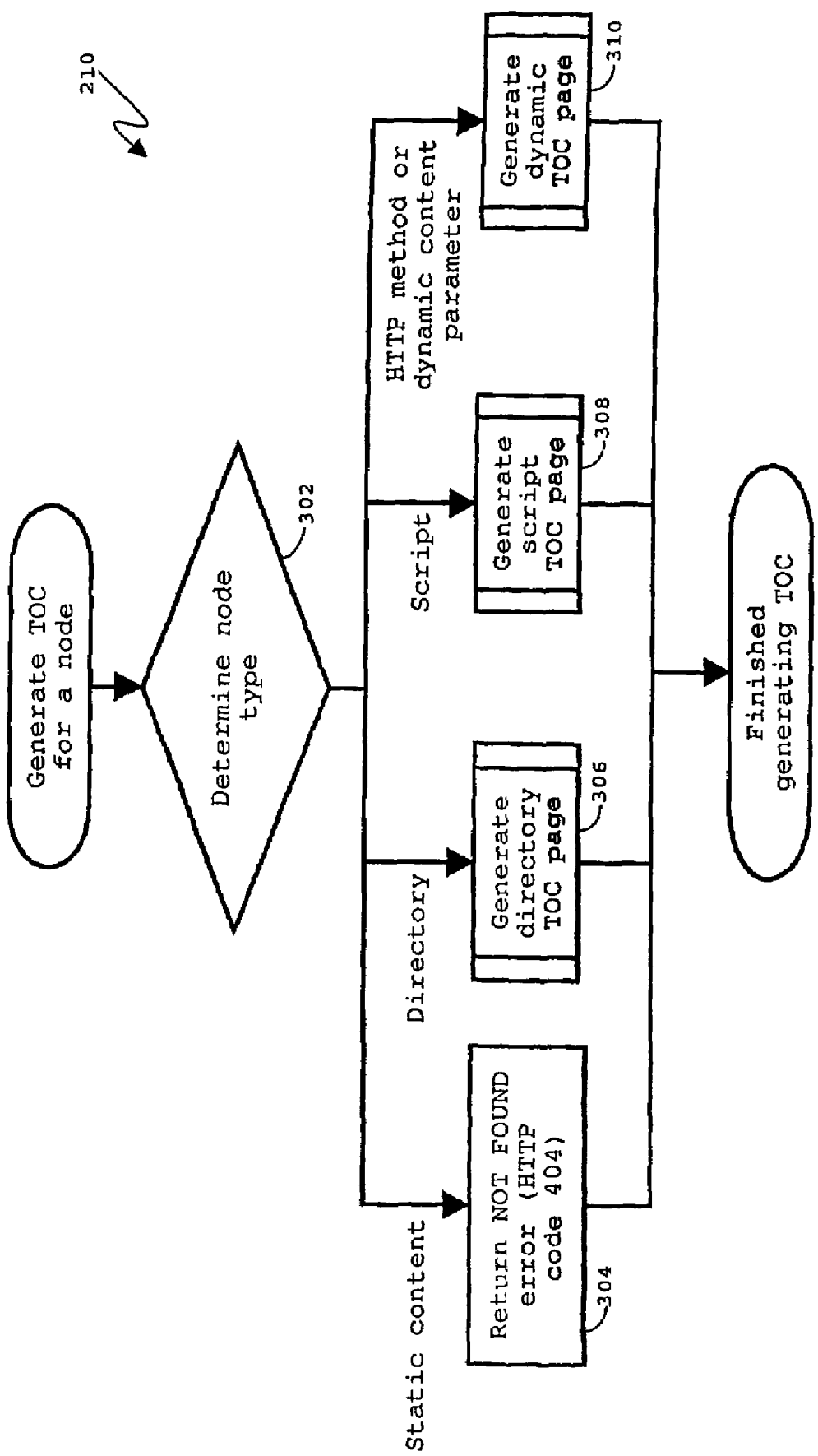
FIG. 3 is a flow diagram of a table of contents selection process executed by the link generation system.

The precise process executed to generate the TOC page for a given node depends upon the type of that node, and is selected by a TOC selection process, as shown in FIG. 3. Each node stored in the WSM database 104 includes data indicating the node type. At step 302, the node type of the request is determined by accessing this data. If the node corresponds to static content of the web server 112, then at step 304 a NOT FOUND error (HTTP code 404) is generated and returned.

Figure 4:
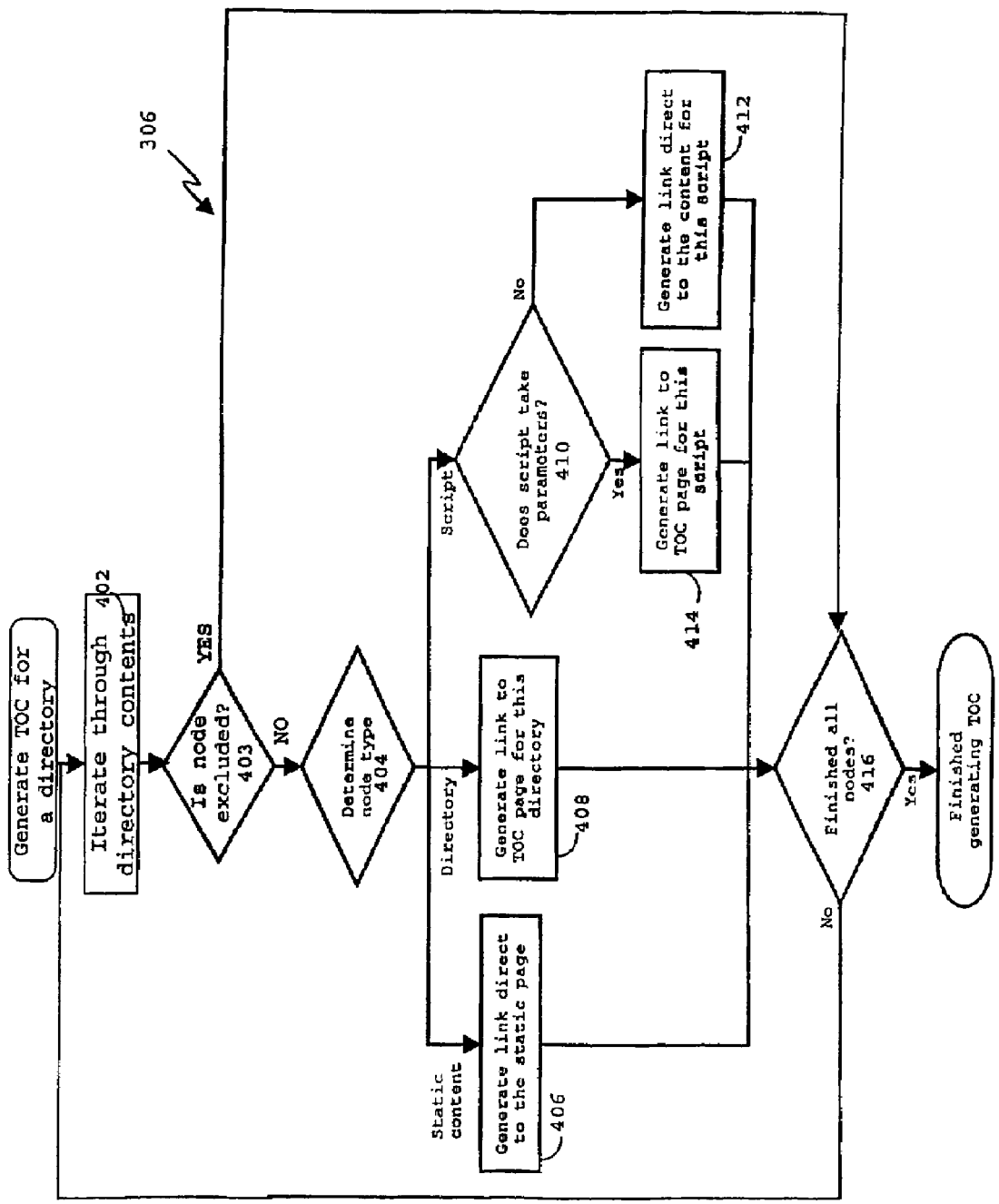
FIG. 4 is a flow diagram of a directory TOC generation process of the TOC generation process.

If the node is a directory node, then the TOC module 106 executes a directory TOC generation process 306, as shown in FIG. 4, that generates a TOC page for the directory. A directory node corresponds to a directory of the web server 112 containing servable content. For example, a directory of the web server 112 corresponding to the hyperlink http://www.mysite.com/products is represented in the TOC by a hyperlink of the form http://www.mysite.com:11571/spiderlinker/toc/products.html as described above. When the user agent 114 selects this link, the user agent 114 sends an HTP request of the form "GET /spiderlink/toc/products-html" to the TOC server 110. The request is forwarded to the servlet 118, which removes the prefix "/spiderlinker/toc/" and the suffix ".html", and then provides the remainder, "products", to the TOC generation module 106. The TOC generation module 106 searches the WSM database 104 for a node named "products", and a match is found with a directory node in the WSM database 104.

The directory TOC generation process loops through each node in the WSM corresponding to child nodes of the corresponding directory node at steps 402 and 416. For each child node, a check is performed at step 403 to determine whether the node has been excluded by an administrator of the system 100, as described above. If the node is excluded, the node is skipped and the next node (if any) is processed. At step 404, the type of node is determined from the WSM entry for that node. If the node corresponds to static content of the web server 112, e.g., a page "/products/mypage.html" with only static content, then at step 406 a hyperlink is generated that refers directly to the static page stored on the web server 112, i.e., http://www.mysite.com/products/mypage.html Otherwise, if the element is a directory, e.g., "/products/images", then at step 408 a hyperlink is generated that refers to the TOC page for that directory, for example, http://www.mysite.com:11571/spiderlinker/toc/products/images.html.

If the node is a script, such as "/forums/viewmessage.php", then at step 410 a check is performed to determine whether the script takes parameters. This information is determined from the web server map database 104, by checking for the existence of at least one inferior node in the hierarchy. If it is determined that the script does not support parameters, then at step 412 a direct link to the script is generated, for example, http://www.mysite.com/forums/viewmessage.php. No encoding is necessary, because a spider can use such a link to retrieve the dynamic content that is generated by the script when it is invoked without parameters. Otherwise, if the script does take parameters, then a hyperlink to the TOC page for the script is generated at step 414, for example HTTP://www.mysite.com:11571/spiderlinker/toc/forums/viewmessage.php.html. After generating an appropriate hyperlink for the node type, a check is performed at step 416 to determine whether links have been determined for all of the nodes in the directory. If not, then the process loops back to step 402 to generate a link for the next node in the directory. When all the nodes in the directory have been processed, the directory TOC generation process finishes.

Figure 5:
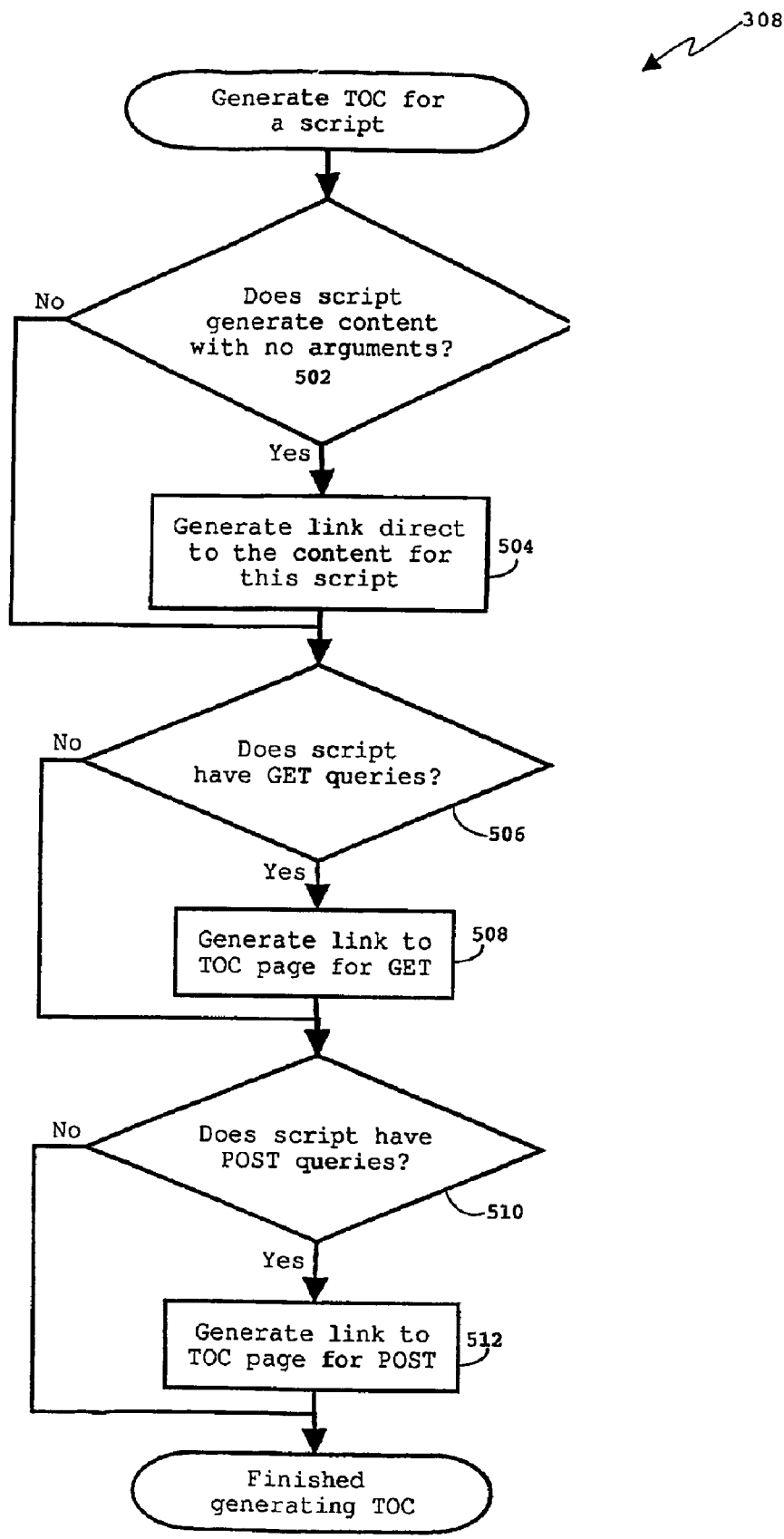
FIG. 5 is a flow diagram of a script TOC generation process of the TOC generation process.

Returning to step 302 of FIG. 3, if the node for which a TOC is to be generated is a script, then a script TOC generation process 308, as shown in FIG. 5, is executed by the TOC module 106. The process begins at step 502 by determining whether the script generates content when executed without arguments. This will be the case if the type field of the Scriptnode in the WSM database 104 has a null value. In this case, at step 504 a hyperlink is generated that refers directly to the script, for example, HTTP://www.mysite.com/forums/viewmessage.php. At step 506, the TOC module 106 determines whether the script supports GET requests. This will be the case if the ScriptNode has a child node whose method field indicates the GET method. A GET request is a form of HTTP request referring to a script and providing any parameters to the script appended to the URI for the script. For example, a script served from "/forums/viewmessage.php" on the web server 112 can be used to execute a request with two parameters "a" and "b" with values of 1 and 2, respectively, by constructing a hyperlink of the form http://www.mysite.com/forums/viewmessage.php?a=1&b=2. In this example, the script "/forums/viewmessage.php" (relative to the root directory of content served by the web server 112) will be executed and provided with a first parameter "a" with a value of 1, and a second parameter "b" with a value of 2. The script can determine the names and values of these parameters from a QUERY_STRING environment variable and can then execute appropriate steps. A typical scenario is for the script to perform an SQL query on the content database 124 of the web server 112 to retrieve entries from the database 122 based on the values of the two parameters. The script would then generate a dynamic HTML page incorporating the data retrieved from the database 122 by the database module 122, and the web server 112 returns this dynamic page to the user agent 114.

The WSM database 104 includes nodes for dynamic pages generated from the content database 124. At least one node is generated for each script of the web server 112 that generates dynamic content. These nodes identify the script used to generate the dynamic content and also indicate any HTTP methods (i.e., GET or POST) supported by the script, and all the parameter-value combinations that can be provided to the script to generate dynamic content. Accordingly, the TOC generation module 106 can determine which methods are supported by a script, and all the possible parameter-value combinations for generating dynamic content, from nodes of the WSM database 104. If it is determined at step 506 that the script accepts GET requests, then at step 508 a hyperlink is generated to the TOC page corresponding to the GET HTTPMethodNode for the script. As described above, the GET HTTPMethodNode TOC page URI is of the general form HTTP://www-mysite.com:11571/spiderlinker/toc/forums/viewmessage.php/G.html. At step 510, the TOC module 106 similarly determines whether the script accepts POST requests. If so, then a POST HTTPMethodNode TOC page URI is generated at step 512. For example, http://www-.mysite.com:11571/spiderlinker/toc/forums/viewmessage.php/P.html. This completes the script TOC generation process.

Figure 6:
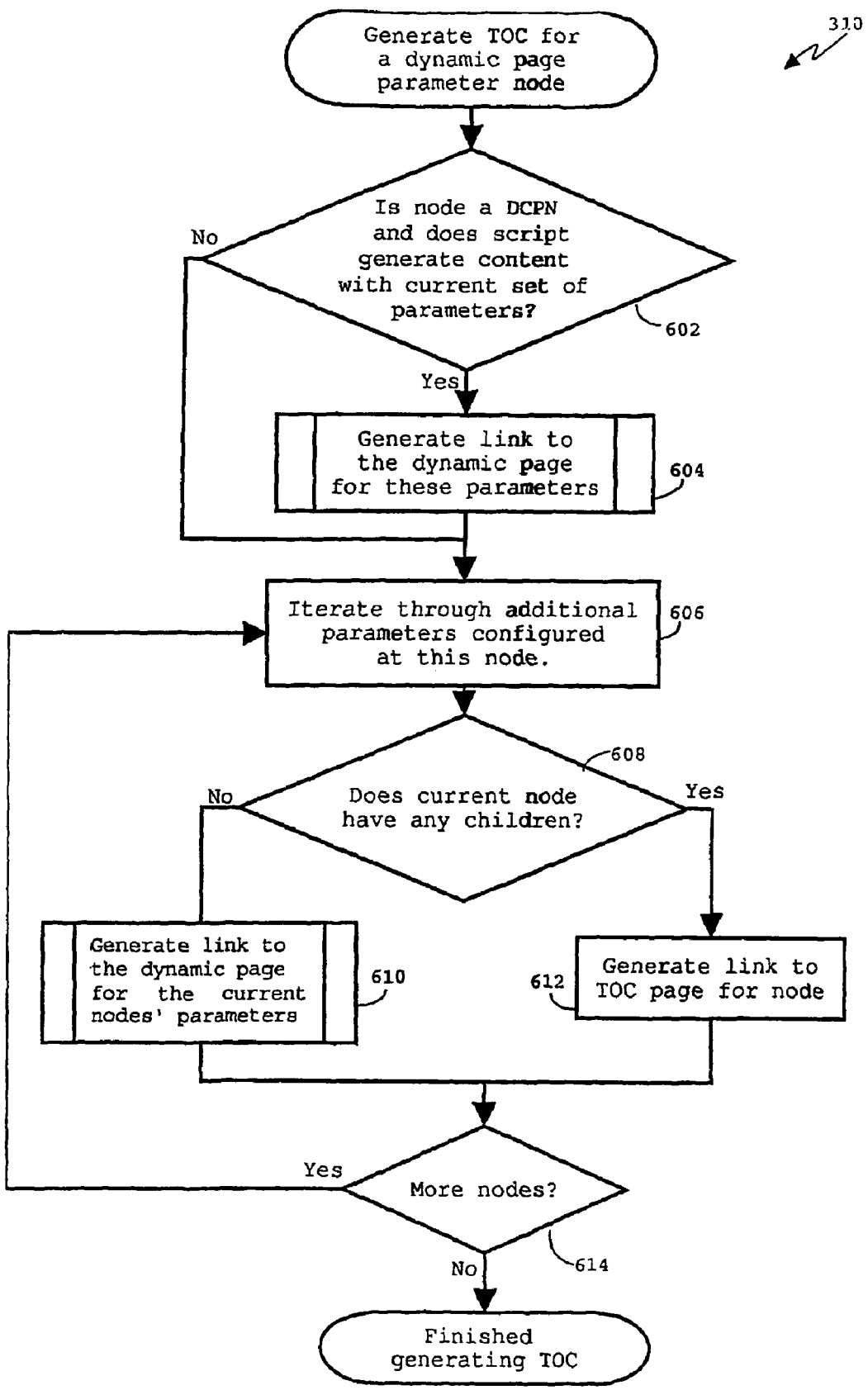
FIG. 6 is a flow diagram of a dynamic page parameter TOC generation process of the TOC generation process.

Returning to FIG. 3, if the node type determined at step 302 corresponds to a script with parameters, the node is referred to as a dynamic page parameter node, and a dynamic page parameter TOC generation process 310 is executed, as shown in FIG. 6. A dynamic page parameter node can take a variety of forms. For example, the node may be an HTTPMethodNode corresponding to a dynamic page generated by the GET or POST methods, for example, /forums/viewmessage.php/G.html, or /forums/viewmessage.php/P.html, respectively. The node may alternatively be a DynamicContentParameterNode (DCPN) with specified parameters, such as "/forums/viewmessage.php?a=1&b=2".

Figure 7:
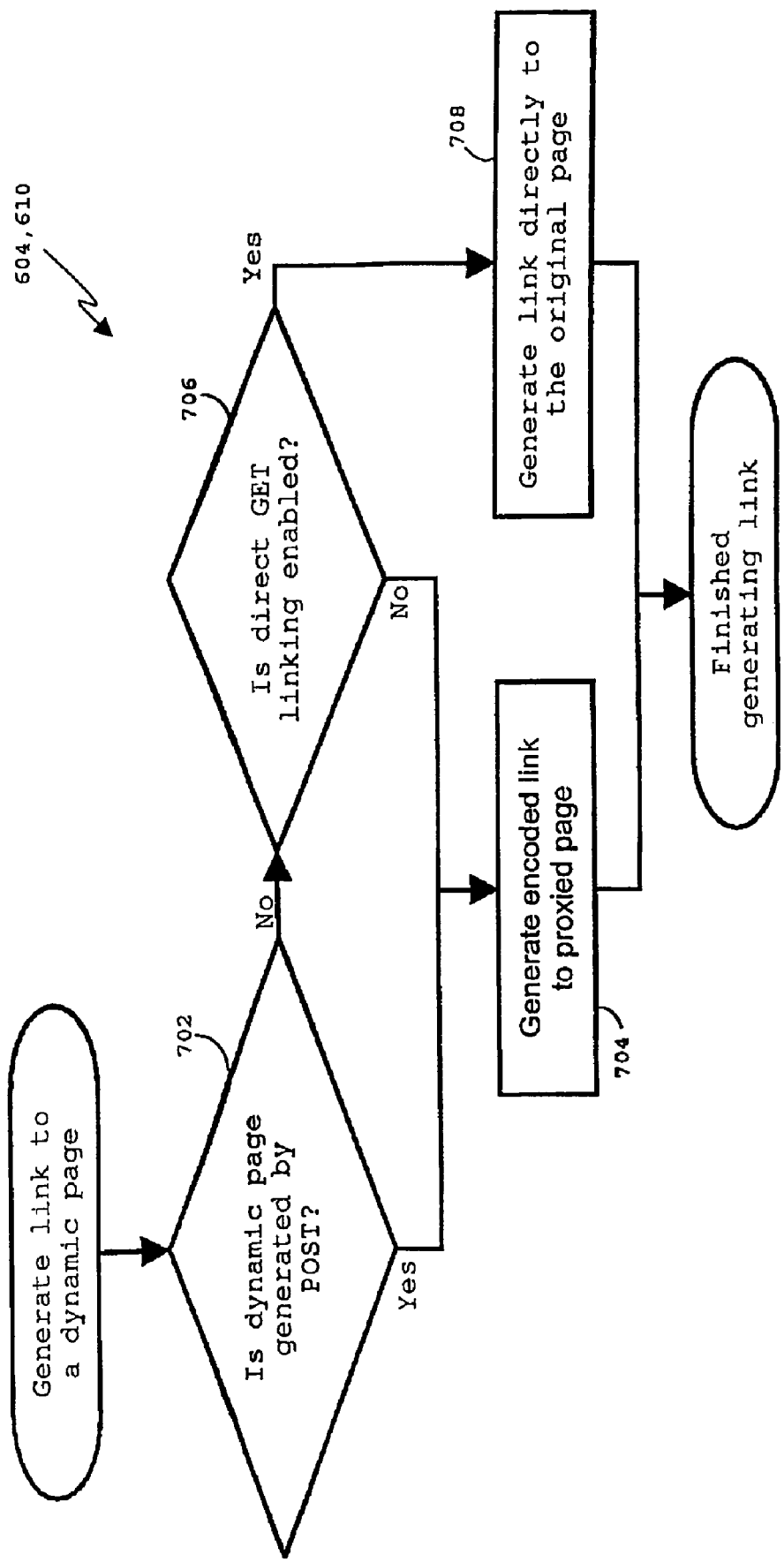
FIG. 7 is a flow diagram of a dynamic page link generation process executed by the link generation system.

The dynamic page parameter TOC generation process begins at step 602, where a check is performed to determine whether the node is a DCPN and, if so, whether the script generates content with the current set of parameters. For example, if the DCPN is "/forums/viewmessage.php?a=1&b=2", whether the link "/forums/viewmessage.php?a=1&b=2" returns dynamic content or whether it requires one or more additional parameters to generate content, e.g., "/forums/viewmessage.php?a=1&b=2&c=3". If the node does generate content with the current parameters, then at step 604 the process generates a link to the dynamic page corresponding to those parameters. This is achieved by executing a dynamic page link generation process, as shown in FIG. 7.

The dynamic page link generation process is used to generate encoded links to dynamic content so that spiders and other user agents can retrieve it. As described above, when a typical spider sees '?', '&', or '=' characters in a URI within a link, it stops processing the link, and the content generated in response to selecting the link is therefore not accessible to the spider. A further difficulty is that dynamic content generated by POST requests cannot be accessed by selecting a link to the corresponding PHP or ASP script due to the nature of POST requests. A POST request is an alternative form of request used to send parameters to scripts. Unlike a GET request, the script parameters for a POST request are not specified as part of the URI—instead, they are specified either through input elements of a FORM element in an HTML page, or through client-side scripting (e.g., JavaScript). Consequently, automated user agents cannot determine the full set of parameters accepted by the script (with the exception of the small class of forms where the full set of allowable parameters is specified in the body of the FORM element). The dynamic page link generation process alleviates these difficulties by generating a link for each page with the page's parameters encoded within the link, thereby allowing user agents to access dynamically generated content by selecting a hyperlink. When an encoded link is selected, the encoded link is translated back into its standard form by the dynamic page proxy module 108 before forwarding the request to the web server 112, as described below.

The dynamic page link generation process begins by determining, at step 702, whether the dynamic page is generated by the POST method. This is determined from the corresponding entry in the WSM 104, as described above, but can also be determined by the TOC node's path (e.g., "/spiderlinker/toc/forums/viewmessage.php.Pa=1&b=2" is a POST method node). If the page is generated by the POST method, then at step 704 an encoded link is generated, referring to a virtual proxy page corresponding to the POST-generated dynamic page. For example, a script /forum/viewmessage.php that accepts two arguments a=1 and b=2 by a POST mechanism will typically have a corresponding proxy link of "/spiderlinker/content/forum/viewmessage.php/Pa=1&b=2.html", where the "a=1&b=2" part has been URI-encoded. However, rather than always using a link suffix of ".html", the system 100 can alternatively be configured to generate a link suffix that indicates the type of content generated. Specifically, a configuration file of the system 100 lists MIME types for dynamic content, and a name extension to be used for each MIME type. For example, if the above script generated an image in a JPEG format, the corresponding link can be "/spiderlinker/content/forum/viewmessage.php/Pa=1&b=2.jpeg". This assists spiders that determine content type based on the filename extension.

As described above, the generation of this link allows POST dynamic content to be reachable by selecting a hyperlink. The "/spiderlinker/content" prefix is included in the encoded link to indicate that a request generated by selecting the link is to be translated back into a standard form for submission to the web server 112, as described below. As described above, links to TOC pages have a prefix of "/spiderlinker/toc". The use of different prefixes for TOC pages and content also ensures that URI namespace conflicts are avoided.

Otherwise, if the dynamic page is generated by a GET mechanism, a test is performed at step 706 to determine whether the system administrator has configured the system to use direct GET linking. The link generation system 100 allows GET links to be encoded and proxied in a similar manner to the encoding of POST requests, to aid spiders that are unable to process hyperlinks with one or more parameters appended. This encoding is performed at step 704, by providing a link of the form "/spiderlinker/content/forum/viewmessage.php/Ga=1&b=2.html", where again the "a=1&b=2" part has been URI-encoded. If, however, direct GET linking is enabled, then at step 708 the process generates a standard, non-proxied link pointing directly to the original page of the web server 112; e.g., "/forum/viewmessage.php?a=1&b=2. The system administrator may chose to use direct GET lining if the TOC pages do not need to be processed by spiders that do not process GET requests with one or more parameters appended. The dynamic page link generation process then ends.

Returning to FIG. 6, the dynamic page parameter TOC generation process loops through any additional parameters configured for the node using step 606 and 614. For each set of additional parameters defining a new node, the process determines, at step 608, whether the child node has any children of its own; i.e., inferior nodes in the hierarchy. The node will have children if dynamic content can be generated using a parameter string that includes the node's parameters in addition to other parameters. In such a case, the links corresponding to the additional parameters are provided in a new, inferior, TOC page, and the process therefore generates, at step 612, a link to the TOC page for that inferior node. Otherwise, if the current inferior node does not itself have any children, then at step 610 the process generates a link to the dynamic page for the current node's parameters by executing the dynamic page link generation process of FIG. 7, as described above. For example, "/spiderlinker/toc/forum/viewmessage.php/Pa=1&b=3.html". In either case, after generating the link, the process loops back at step 614, to step 606 to process the next set of additional parameters. If there are no more additional parameters, then the dynamic page parameter TOC generation process ends.

In order for these encoded GET and POST method links to be used by the user agent 114 to retrieve dynamic content from the web server 112, the HTTP requests sent in response to selecting these links are translated into standard GET or POST requests, respectively. This translation is performed by the dynamic page proxy module 108, which forwards the translated request to the web server 112. Returning to FIG. 2, a request received by the TOC server 110 is inspected at step 212 to determine whether the request is for a proxied dynamic page, as indicated by the presence of the prefix "/spiderlinker/content" in the request. If the request is not for proxied content, and, through step 204, the request was also not for a TOC page, then the request is rejected and the TOC server 110 returns a NOT FOUND error HTTP code 404 to the user agent 114 at step 214.

Otherwise, if the request is for a proxied dynamic page, then the request is translated at step 216. If the request is an encoded GET request, for example, "/spiderlinker/content/forums/viewmessage.php/Ga=1&b=2.html" where the "a=1&b=2" part is URI-encoded, then the "/spiderlinker/content" prefix is removed, the "/G" part is translated to a "?", the URI-encoded parts are decoded, and the URI suffix (".html" in this case) is removed to give "/forums/viewmessage.php?a=1&b=2". The translated request is then forwarded to the web server 112 at step 218.

If the encoded request is for a POST request, for example, "/spiderlinker/content/forums/viewmessage.php/Pa=1&b=2.html", where the "a=1&b=2" part has been URI-encoded, then the translation is performed as follows. The "/spiderlinker/content" prefix is removed, the last part of the request from the last forward slash onwards is removed, and the parameters are decoded and provided, one per line, in a standard POST request format. For example, the above request may be formatted and sent to the web server 112 as follows:

POST/forums/viewmessage.php HTTP/1.0

. . .

&a=1

&b=2 where the ellipsis represents standard POST request fields, including Accept, User-Agent, From, Content-Type, and Content-Length. When the web server 112 receives this request, the script "/forums/viewmessage.php" will be executed to generate dynamic content, and the result will be returned to the dynamic page proxy module 108.

If the dynamic content returned from the web server 112 is determined to be an HTML web page (at step 220), then an HTML BASE tag referencing the appropriate URI of the web server 112 is added to the web page at step 222 if not already present. The inclusion of the BASE tag ensures that any relative references in a dynamically generated web page always refer back to the web server 112 and not to a non-existent relative link within the /spiderlinker/content namespace. For example, a dynamically generated web page generated in response to a selection of the link "http://www.mysite.com:11571/spiderlinker/content/forums/viewmessage.php/Pa=1&b=2. html" may contain a relative link " . . . /products.html", which is intended to refer to "http://www.mysite.com/products.html". However, without a BASE tag, the URI provided by the TOC would cause this relative reference to resolve to "http://www.mysite.com:11571/spiderlinker/content/forums/products.html" which may not exist, and in any case does not correspond to the appropriate content. By inserting a BASE tag with an appropriate URI for the page, in this case:

<BASE HREF="http://www.mysite.com/forums/"> into the dynamically generated page, relative references are assured to be correct. The dynamically generated content is then forwarded back to the user agent 114 at step 224.

The link generation system 100 described above allows the user agent 114 to access all content of the web server 112 (except for content excluded by an administrator, as described above) via links of the TOC generated by the link generation system 100. If the user agent 114 is a search engine spider, then the entire content, including dynamic content, of web sites served by the web server 112 can be indexed and will become visible to users searching the web using the corresponding search engine.

Figure 8:
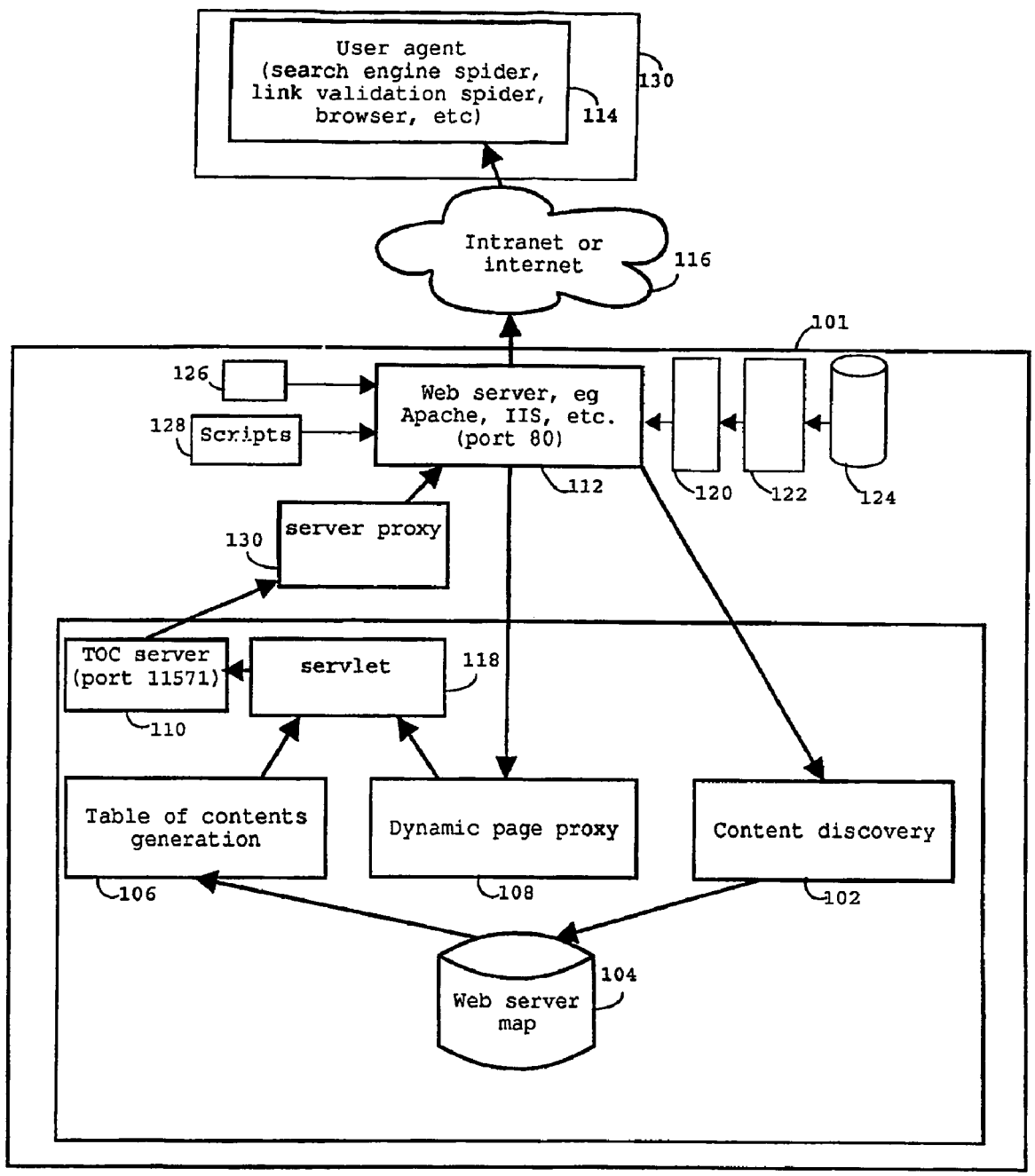
FIG. 8 is a block diagram of a second preferred embodiment of the link generation system.

The link generation system 100 described above can be directly accessed by a link of the form HTTP://www.mysite.com:11571/spiderlinker. It is appreciated that it is generally desirable to have as few ports of the link generation system 100 as possible accessible from the Internet 116 due to security considerations. Furthermore, the requirement of including the port number in the URI may also be undesirable. In an alternative embodiment, a link generation system 101 receives all HTTP requests on port 80, and includes a server proxy script 130, as shown in FIG. 8.

The web server 112 processes all HTTP requests received by the link generation system 100 and determines whether the request should be forwarded to the server proxy script 130. Specifically, a request for a resource whose name starts with "/spiderlinker/" is identified as a request for the TOC server 110, and hence the web server 112 executes the server proxy script 130, which forwards the request to the TOC server 110 on port 11571. A request for a resource that does not begin with this string is processed in the standard manner by the web server 112. The use of the server proxy script 130 allows all requests directed to the link generation system 100 to be received on port 80, which may be desirable. The disadvantage of this configuration is the additional overhead incurred for proxied pages. For example, if the user agent 114 sends a request for a link generated by the link generation system 101 and referring to a dynamic content page, then this request will be processed as follows:

(i) the user agent 114 sends an HTTP request for a dynamic proxied page to the link generation system 100;
(ii) the web server 112 receives the request, determines that it is for a dynamic proxied page, and executes the server proxy script 130 which forwards the request to the TOC server 110;
(iii) the TOC server 110 receives the request, and forwards it to the dynamic page proxy module 108 via the servlet 118;
(iv) the dynamic page proxy module 108 translates the request, and forwards the translated request to the web server 112;
(v) the web server 112 receives the translated request, generates the dynamic page, and returns it to the dynamic page proxy module 108; and
(vi) the dynamic page proxy module 108 forwards the page to the servlet 118, which forwards it to the TOC server 110, which forwards it to the user agent 114.

Figure 9:
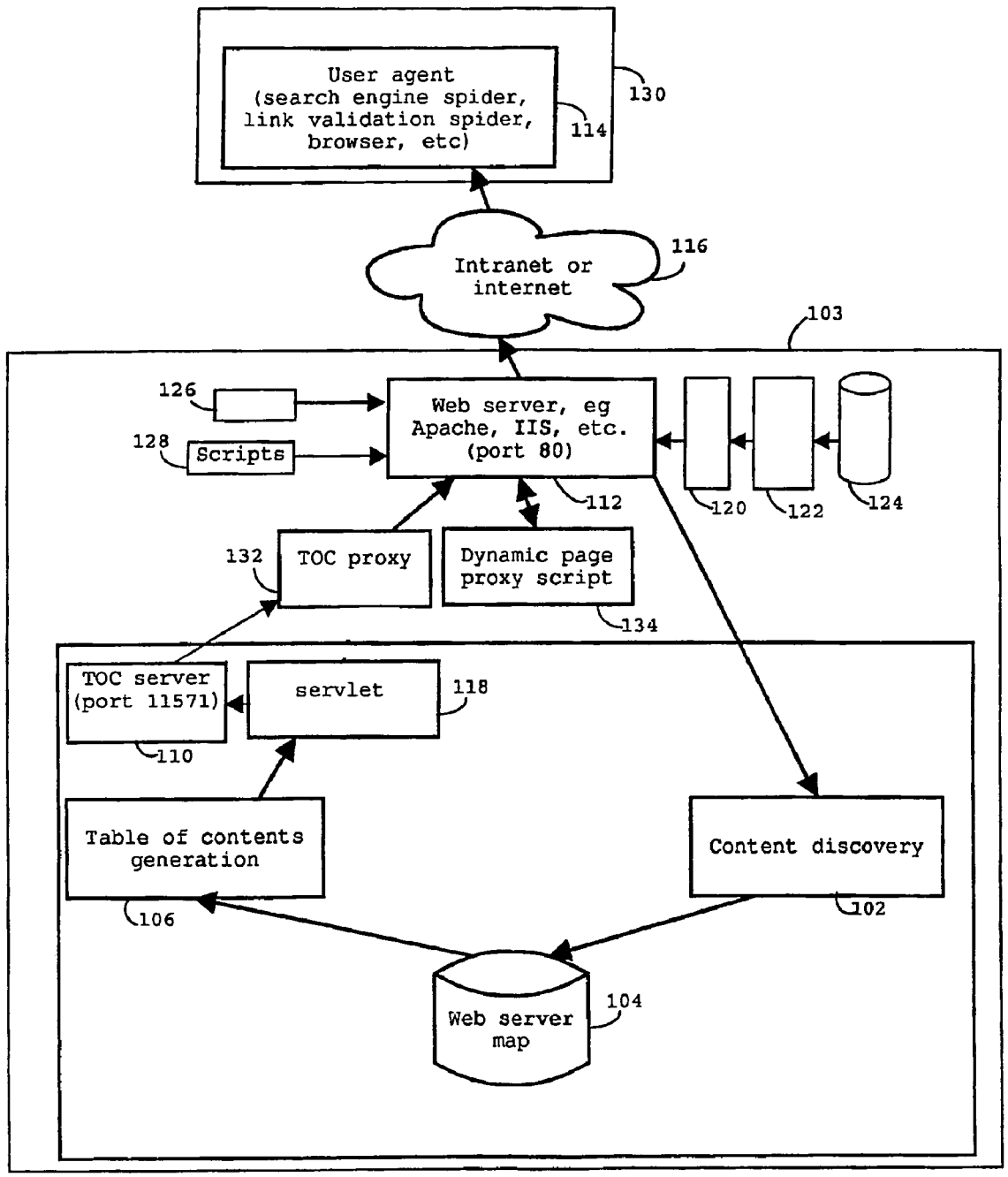
FIG. 9 is a block diagram of a third preferred embodiment of the link generation system.

This inefficient processing increases the load on the link generation system 101 and degrades its performance. As shown in FIG. 9, a further embodiment provides a link generation system 103, replacing the server proxy 130 of FIG. 8 with a TOC proxy script 132 and dynamic page proxy script 134. The TOC proxy script 132 forwards HTTP requests for TOC pages to the TOC server 110, as per the previous embodiment 101 described above. However, dynamic page requests are processed by the dynamic page proxy script 134 and handled directly by that script, rather than by the dynamic proxy module 108 in the TOC server 110. This reduces the overhead for proxied dynamic page requests considerably. Note that in this configuration, the dynamic proxy module 108 is not required, with the dynamic page proxy script 134 providing equivalent functionality.

Although the TOC is described above as being generated in an HTML format, the table of contents (TOC) generation module 106 can generate the TOC in a number of output formats, depending upon configuration. Specifically, the TOC can be generated in the following formats:

(i) HTML, as a set of web pages having either a hierarchical or flat structure; or as a single web page containing the entire TOC;
(ii) extensible markup language (XML). This facilitates the provision of indexing and meta-information (e.g., a page title, etc) for each link. This is particularly useful for submission to search engines that are configured to process index links in XML format; for example, on link submission form pages;
(iii) Harvest control lists (HCL). An HCL is an XML-based index file for a web site, based on the Australian Government Locator Service (AGLS) metadata standard, as described at http://www.naa.gov.au/recordkeeping/gov_online/agls/guidelines/chpt11.html. Up to 19 descriptive elements can be defined.
(iv) The file "sitelist.txt". This is an emerging standard used by spiders to improve their performance when indexing sites, as described at http://customultraseek.org/server-sitelist.html. The file "sitelist.txt" includes a header and a body. The header includes a "Sitelist-ID" field defining the domain name and port number of the corresponding web site, such as "www.mysite.com:8080." The body effectively provides a list of links, one per line, being the path component of a URI, such as "/forums/products.html", rather than a hyperlink. It will be apparent that a URI and hyperlink can readily be generated from each path using the "Sitelist-IM" field. Each path is accompanied by the corresponding content's modification date in UNIX time format and its size in bytes.

The precise content of each format can also be configured to include specific information for each document as desired. For example, information such as a document's meta-data (i.e., defined in one or more HTML <META> elements), document title, last modified time, an initial or sample extract from the document, and so on, can be included in the TOC. This feature is particularly useful for use with spiders that will reject a web page if it contains a large number of links with relatively little content, assuming the page to have been generated solely for the purpose of manipulating search engine results. By including additional information with each link (for example, an extract from the document), this can prevent the page being rejected by the spider. The feature is also useful for site administrators, who can use the resulting TOC pages as an administration tool, providing an overview of their site. The TOC generation module 106 can also be configured to generate TOC links only for documents that have been created or modified since the previous time that TOC links were generated. This is particularly useful for generating updated links for submission to search engines.

A TOC generated by the link generation system can be provided in a number of ways. As described above, the TOC can be dynamically generated and provided as one or more responses to respective HTTP requests, via the TOC server 110. Alternatively, it can be generated and then stored on the link generation system 100, 101, 103 as one or more data files.

Alternatively, it can be sent to a remote system via a network protocol such as simple mail transport protocol (SMTP), file transfer protocol (FTP), or HTTP PUT or POST. The latter methods are particularly useful for delivering TOC links to search engines, so that the TOC generation and delivery are both handled automatically, greatly simplifying the webmaster's job. TOC delivery can be scheduled to occur at appropriate intervals.

Figure 10:
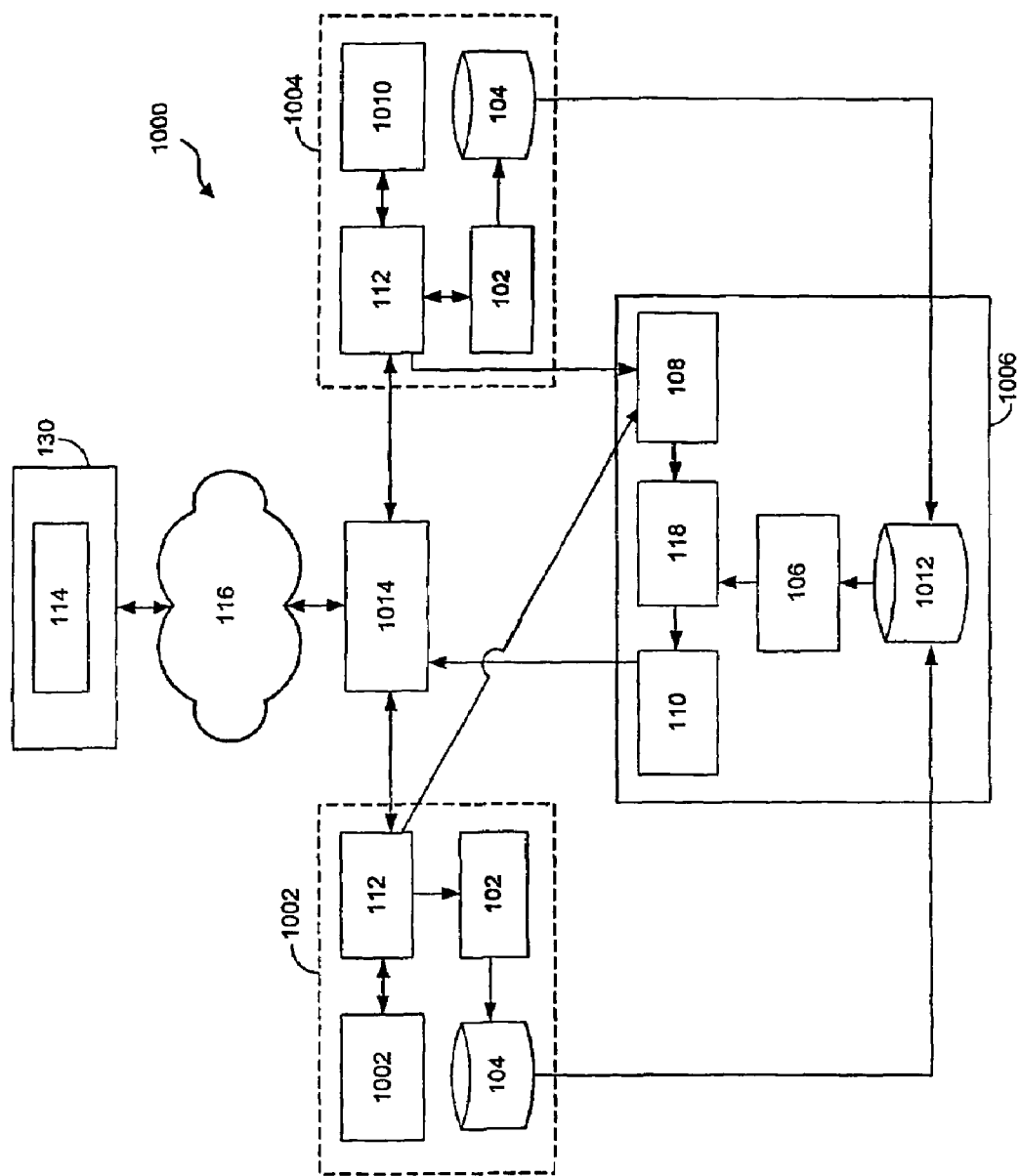
FIG. 10 is a block diagram of a fourth preferred embodiment of the link generation system.

In situations where multiple physical servers are used to support multiple web sites, there is no need to have one instance of the link generation system 100, 101, 103 on each physical server. In such cases, a distributed architecture, as shown in FIG. 10, can be used. FIG. 10 shows a link generation system 1000 having two physical web site host systems 1002 and 1004 connected to the Internet 116 via a router 1014. Each host system 1002, 1004 includes the web server 112 and respective web site content 1008, 1010, including static HTML files, scripts, and database content. Each of the host systems 1002, 1004 also includes the scripting module 120 and the database module 122; however, these are not shown in FIG. 10. Each of the host systems 1002, 1004 also includes an instance of the content discovery module 1002, which is used to generate a web server map database 104 on each system, as described above. Also shown in FIG. 10 is a TOC system 1006, including the TOC server 110, the servlet 118, the dynamic page proxy module 108, the table of contents generation module 106, and a global web server map database 1012. With this arrangement, each of the host systems 1002, 1004 generates its own local web server map database 104, as described above. However, the data in each web server map database 104 is also copied to the global web server map database 1012 on the TOC system 1006. This global web server map database 1012 therefore contains a global web server map representing all web sites hosted by the host systems 1002, 1004. Requests for TOC pages received at either of the host systems 1002, 1004 are redirected from the corresponding web server 112 to the dynamic page proxy 108 of the TOC system 1006. In response, a TOC page is generated in the usual way, but using the global web server database 1012.

Although FIG. 10 shows an arrangement with only two physical host systems 1002, 1004, it will be apparent that this arrangement can be used with additional physical host systems whilst maintaining a single global TOC system 1006 for generating TOC pages for any of the web sites hosted by these systems.

A further advantage of the above arrangement is that it allows global processing of the web site content of all of the web sites hosted by the physical host systems 1002, 1004. For example, each entry in the global web server map database 1012 can be associated with numeric ranking data, such as the access frequency of the corresponding web site node. This data can then be provided with links generated by the TOC system 1006 to allow ranking of search engine results with the access frequency of the corresponding web page, whether that page is static or dynamically generated. Although the link generation systems 100, 101, 103, 1000 have been described above in terms of web pages and the Internet, the TOC generation process can be applied to any structured data set, where nodes of the set include one or more links to other nodes. Typically, though not necessarily, such a data set is structured hierarchically, and examples of hierarchical data sets include file systems, FTP sites, and LDAP servers.

Many modifications will be apparent to those skilled in the art without departing from the scope of the present invention as herein described with reference to the accompanying drawings.

The invention claimed is:

1. A link generation process, the process being performed by a computer system, and comprising:
   accessing files of a network site including a server configured to send network site content to remote clients in response to receipt of requests for said content from said clients, said content including dynamically generated content which is generated in response to receipt of at least some of said requests, at least some of said requests including parameters that determine said dynamically generated content;
   analyzing the accessed files to identify at least one of valid parameters, valid values for parameters, and valid combinations of parameters used by executable code and/or scripts of said network site to determine said dynamically generated content;
   generating, based on said analyzing, data representing nodes of a hierarchy of linked nodes for use in indexing content of said network site, wherein leaf nodes of said hierarchy include alternative links for use in accessing said dynamically generated content, each of said alternative links being adapted for use in determining a corresponding link and one or more corresponding parameters that, in combination with the corresponding link, determine corresponding dynamic content of said network site; and
   sending the generated data to a user agent.

2. The process as claimed in claim 1, wherein said generating includes generating a table of contents for content of said network site, said table of contents including said alternative links.

3. The process as claimed in claim 2, wherein said table of contents fully connects said content of said network site.

4. The process as claimed in claim 2, wherein said table of contents includes one or more pages, at least one of said pages including one or more of said alternative links.

5. The process as claimed in claim 2, wherein said table of contents includes a plurality of pages, each of said pages including one or more links to respective others of said pages, at least one of said pages including one or more of said alternative links.

6. The process as claimed in claim 5, wherein links in said table of contents pages are arranged as a hierarchy corresponding to said hierarchy of linked nodes.

7. The process as claimed in claim 2, including generating a link to a table of contents page for a script that dynamically generates content of said network site on the basis of supplied parameters, wherein said table of contents page for said script includes a plurality of said alternative links corresponding to respective parameters for said script.

8. The process as claimed in claim 2, including generating a link to a table of contents page for a script that dynamically generates content of said network site on the basis of supplied parameters, wherein the table of contents page for said script includes a plurality of said alternative links corresponding to respective combinations of parameters and parameter values for said script.

9. The process as claimed in claim 7, wherein the table of contents page for said script includes at least one link to a further table of contents page including links corresponding to respective parameters or parameter values for said script and including at least one common parameter or parameter value.

10. The process as claimed in claim 1, wherein said data files include at least one of web server configuration files, scripts, and database tables.

11. The process as claimed in claim 1, wherein said analyzing includes analyzing scripts of said network site to identify valid database query parameters on the basis of structured query language statements of said scripts.

12. The process as claimed in claim 1, wherein said analyzing includes analyzing said data files to identify valid combinations of database query parameters and values for generating said dynamically generated content.

13. The process as claimed in claim 12, wherein said analyzing includes analyzing database tables associated with said network site to identify said valid combinations of database query parameters and values.

14. The process as claimed in claim 1, wherein said alternative links are in the form of links to static content.

15. The process as claimed in claim 1, wherein each of said alternative links includes a suffix that indicates a type of dynamically generated content for the link.

16. The process as claimed in claim 1, wherein said alternative links include at least one link having a prefix identifying the link as a link to a table of contents page and at least one link having a prefix identifying the link as a link to content of said network site.

17. The process as claimed in claim 1, including:
determining whether said user agent is an indexing agent;
sending a table of contents page to said remote agent if said user agent is an indexing agent; and
sending the requested content to said user agent if said user agent is not an indexing agent.

18. The process as claimed in claim 1, wherein said alternative links are URI-encoded, and said processing includes decoding said URI-encoding.

19. The process as claimed in claim 1, wherein:
said analyzing includes analyzing said data files to identify all servable static content of said network site and all servable dynamically generated content of said network site; and
said generating includes generating links to said servable static content and said servable dynamically generated content to provide a table of contents for all servable content of said network site.

20. The process as claimed in claim 1, including analyzing scripts of said network site to determine request data for retrieving said dynamically generated data, wherein said alternative links are generated on the basis of said request data and said parameters.

21. The process as claimed in claim 20, wherein said step of analyzing scripts includes analyzing said scripts to determine access data for accessing a database of said network site to generate said dynamically generated content.

22. The process as claimed in claim 1, wherein said steps of analyzing and generating am executed by said computer system at periodic intervals.

23. The process as claimed in claim 1, wherein said steps of analyzing and generating am executed in response to receiving a request for content of said network site.

24. The process as claimed in claim 5, wherein all servable data of said network a can be accessed via selection of any one of the links to said pages.

25. The process of claim 1, wherein said encoded links are in a standard form suitable for an arbitrary indexing agent.

26. The process of claim 1, wherein said dynamically generated content is not linked to by other content of said network site.

27. The process of claim 1, wherein the step of generating includes generating the alternative links in a form suitable for processing by an indexing agent that cannot process the corresponding links with parameters to allow indexing of the corresponding dynamic content of said network site.

28. The process of claim 1, wherein each of the corresponding links includes a path component and a query string component, and the step of generating includes generating each of the alternative links without a query string component so that a user agent that does not process links with query string components can access the corresponding dynamic content of said network site.

29. The process of claim 28, wherein one or more reserved characters are used as separators between the path components and the query string components and between parameters within the query string components, and the step of generating includes generating each of the alternative links without the reserved characters so that a user agent that does not process links with the reserved characters can access the corresponding dynamic content of said network site.

30. The process of claim 1, wherein the corresponding links include one or more of the reserved characters '?', '&', and '=', and the step of generating includes generating each of the alternative links without any of the reserved characters so that a user agent that does not process links with the reserved characters can access the corresponding dynamic content of said network site.

31. The process of claim 2, wherein the dynamically generated content includes dynamically generated documents, and the generated table of contents includes a title for at least one of said dynamically generated documents.

32. The process of claim 2, wherein the dynamically generated content includes dynamically generated documents, and the generated table of contents includes metadata of at least one of said dynamically generated documents.

33. The process of claim 2, wherein the dynamically generated content includes dynamically generated documents, and the generated table of contents includes an extract from at least one of said dynamically generated documents.

34. A computer readable storage medium having stored thereon program code for executing the process of claim 1.

35. A system having components configured to execute the process of claim 1.

* * * * *